US 6,715,518 B2

(12) United States Patent
Finkowski et al.

(10) Patent No.: US 6,715,518 B2
(45) Date of Patent: *Apr. 6, 2004

(54) APPARATUS AND METHOD FOR DEPOSITING COOKIE DOUGH INTO A TRAY

(75) Inventors: James W. Finkowski, Andover, MN (US); Chad M. Kubat, Woodbury, MN (US); Robert F. Meyer, Brainerd, MN (US); Daniel B. Migliori, Shakopee, MN (US); Glenn O. Rasmussen, Champlin, MN (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/229,962

(22) Filed: Aug. 28, 2002

(65) Prior Publication Data

US 2003/0041917 A1 Mar. 6, 2003

Related U.S. Application Data

(63) Continuation-in-part of application No. 09/941,236, filed on Aug. 28, 2001, now Pat. No. 6,561,235.

(51) Int. Cl.[7] .............................. B65B 43/42; B67C 3/00
(52) U.S. Cl. ..................... 141/129; 141/168; 141/172; 141/192; 141/269; 426/516; 426/518; 198/468.8; 99/559
(58) Field of Search ...................... 141/129, 168, 141/172, 192, 269; 426/390, 391, 446, 516, 518; 425/10, 192 R; 198/468.8; 99/537, 559, 564

(56) References Cited

U.S. PATENT DOCUMENTS

| 1,903,570 | A | 4/1933 | Kremmling |
| 2,158,910 | A | 5/1939 | Pellar |

(List continued on next page.)

FOREIGN PATENT DOCUMENTS

| DE | 87 15 463 | 3/1999 |
| FR | 1 102 352 | 10/1955 |
| GB | 322573 | 12/1929 |
| GB | 401513 | 11/1933 |

OTHER PUBLICATIONS

PCT International Search Report, PCT/US02/27490 (5 pages).

*Primary Examiner*—Gregory L. Huson
*Assistant Examiner*—Peter deVore
(74) *Attorney, Agent, or Firm*—Kagan & Binder, PLLC.

(57) ABSTRACT

An apparatus utilizes an object holding technique for holding a tray or discrete object while supplying a dough product onto the tray or discrete object. Preferably, a conveyor transports the tray or discrete object for receiving dough products. A subframe preferably moves the tray or object, by way of deflecting the conveyor, to a position with respect to a dough supplying device such that dough products may be placed on the tray or object. In an embodiment, a cutoff blade may be utilized to portion the dough products. Preferably, the operation of the conveyor, subframe, supply device, and cutoff blade are controlled by a control system. The present invention is also directed to methods of portioning and placing dough products on a tray or discrete object by way of such an apparatus.

33 Claims, 13 Drawing Sheets

U.S. PATENT DOCUMENTS

| | | | |
|---|---|---|---|
| 2,429,042 A | 10/1947 | Bader | 107/54 |
| 2,728,508 A | 12/1955 | Marasso | |
| 2,781,732 A | 2/1957 | Lenherr | |
| 3,589,306 A | 6/1971 | Logan | 107/27 |
| 3,722,560 A | 3/1973 | Morine et al. | 141/172 |
| 4,190,410 A | 2/1980 | Rhodes | |
| 4,292,917 A | 10/1981 | Ezaki | 118/16 |
| 4,735,566 A | 4/1988 | Squicciarini | 425/312 |
| 4,809,575 A | 3/1989 | Swanson | 83/152 |
| 5,154,211 A | 10/1992 | Daleiden et al. | |
| 5,476,035 A | 12/1995 | Florindez | |
| 5,817,361 A | 10/1998 | Campbell et al. | 426/496 |
| 6,139,178 A | 10/2000 | Whysall | |
| 6,561,235 B2 * | 5/2003 | Finkowski et al. | 141/172 |
| 2003/0041917 A1 | 3/2003 | Finkowski et al. | 141/29 |

* cited by examiner

APPARATUS AND METHOD FOR DEPOSITING COOKIE DOUGH INTO A TRAY

This application is a continuation-in-part of U.S. patent application Ser. No. 09/941,236, filed Aug. 28, 2001, entitled "APPARATUS AND METHOD FOR DEPOSITING COOKIE DOUGH INTO A TRAY", U.S. Pat. No. 6,561,235 which application is incorporated herein by reference in its entirety.

TECHNICAL FIELD

The present invention relates to equipment that is suitable for portioning and placing food products, such as for portioning and placing cookie products, and methods of portioning and placing such cookie products. In particular, the present invention is directed to such a portioning and placing apparatus and method of portioning and placing where a cookie product can be portioned and placed directly into a tray or similar object.

BACKGROUND OF THE INVENTION

Consumer food products that are simple and easy to prepare are desirable to consumers. With respect to ease of preparation, consumers enjoy food products that can be stored for long periods of time, e.g., by refrigeration or freezing. Also, products that can be quickly cooked and consumed are attractive to consumers. To this end, food products that are sold in a form for quick and easy preparation are highly desirable.

Conventional frozen cookie products may be sold to small vendors and retail shops that desire the convenience and quality of frozen cookie dough to make fresh baked cookies at the store location. Generally, these frozen cookie products are sold to the commercial consumer in bulk form. Other consumers, such as household consumers, prefer the frozen cookie products be packaged in generally smaller quantities and in a convenient form.

Typically, cookie dough is mixed in large volume mixers and portioned on high-speed lines forming individual cookies, which are frozen and packaged to be baked at a later date. According to one known technique, cookie dough pieces are extruded from a die, cut to length, and deposited in rows on conveyors or continuous sheets of paper in varying numbers depending on the size of the cookie. Generally, these sheets are carried by conveyors and the cookies are subsequently frozen on the sheets, and the sheets are cut for packaging. Generally, for the commercial consumer the frozen cookie dough pieces are packaged on the cut sheets as bulk product in cartons for sale to the customer. However, for the household consumer, it is desirable to package the frozen cookie products in smaller more convenient packages, such as on paperboard. Thus, an additional transfer step is required in order to get a quantity of cookie pieces on such trays and then in packages, which requires additional handling operations that may be done by hand or performed by separate processing equipment.

One example of a machine used to manufacture cookie dough pieces is produced by APV Baker, Inc. of Goldsboro, N.C., and is known as a wire cut machine. Generally this apparatus operates by forcing a continuous supply of cookie dough downward through shaping dies by using a conventional food product depositor. A cutting wire or knife is passed beneath each such die at repeated time intervals, thereby slicing off a short cylindrical (or otherwise-shaped) segment of the cookie dough, representing an individual cookie. As cookie dough is extruded from a die, paper of indefinite length is fed onto a conveyor belt that passes beneath the die. The belt is raised close to the die to allow the cookie dough to contact the paper and the height of the slug of dough is established. It is about the time the belt begins to be lowered from the highest position, that the wire or knife is passed through the dough to cut and form the individual cookie. The cutting wire is lowered and retracted below the advancing dough in preparation for the next cut. The die may be arranged to cut a single slug of dough for each wire stroke, typically used in a lab development process, or, have many openings in a row to produce numerous cookie pieces during each wire stroke. Generally, cams and lever arms are used in this type of equipment to control the relative motion.

Usually, in this process, the conveyor belt runs continuously, such that a row of cookies is deposited in a new position adjacent to the previous row with each wire stroke. Typically, the spacing is controlled by the speed of the conveyor. After a number of rows have been deposited in succession, additional speed may be temporarily added to the conveyor belt to create a larger gap between the two adjacent rows of cookies. In this manner, an array of cookie dough pieces can be deposited on a sheet of paper. Because the paper is continuous, the weight of previously deposited cookies (downstream of the deposition) keeps the paper moving with the conveyor both forward and in particular up and down. After the cookie dough contacts the paper to form the height of the slug of cookie dough, the conveyor is lowered. This lowering movement would tend to lift the paper off of the conveyor because the dough may be somewhat sticky without the weight of the previously deposited cookies downstream. In order to keep sufficient weight near the extrusion area, the paper is cut sufficiently downstream either before or after freezing the cookies. If to be packaged for the commercial customer, the paper is cut in proportion to a package design into which it will be placed. For the household or small-scale customer, the cookies are typically packaged into trays or similar cartons individually and as a separate process.

A problem of the above-described equipment and process for forming and packaging frozen cookie dough products is that a separate processing step must be used to package cookies in a tray or carton. That is, cookies must be removed from the sheet of paper or the paper must be severed such that cookies may be transferred to another storage or shipping media. As such, the resulting manufacturing process is inefficient and not cost effective to the end consumer.

SUMMARY OF THE PRESENT INVENTION

The present invention is directed to methods and apparatus for portioning and placing one or more dough products, such as cookie dough, directly into a tray or other object that can be individually loaded, handled, and transported through the apparatus, thereby eliminating a need to further transfer the dough pieces or to further manipulate (i.e. cut) the material onto which the dough pieces are deposited. In accordance with the present invention, dough product pieces can be deposited directly onto the object that will be incorporated within a package design without otherwise modifying the object. In particular, the present invention is preferably directed to batch processing methods and apparatus whereby a complete row of cookie dough slugs may be simultaneously placed into a plurality of trays. More preferably, as will be described in the preferred embodiment below, trays for receiving cookie dough slugs are carried on a conveyor system and are positioned beneath a cookie dough depositing or supplying device. In one aspect of the present invention the trays are raised to contact the cookie dough and thereby form the height of a cookie dough slug. As the trays are lowered a blade or wire passes through the extruding stream of cookie dough thereby creating individual cookie dough slugs. In another aspect of the present invention the trays are lower to clear a lip of the tray so that a cookie dough slug can be supplied to the tray.

The present invention is directed to techniques of placing cookie dough slugs directly into a tray where the tray's ability to move up and down and forward with a conveyor is improved in contrast to the need to use a continuous sheet of material as described above in the Background section. Specifically, a system is utilized to securely hold the tray in place while the tray is being moved and for certain application while cut off of the cookie dough slugs is taking place. Such resistance to tray pull away leads to the ability to portion and deposit cookie dough slugs directly into small and light trays. Furthermore, efficient and high-speed batch processing may be accomplished.

In one aspect of the present invention, an apparatus for supplying a dough product onto a tray or discrete object is provided. Preferably, a driven conveyor, operatively supported on a support frame, is utilized for transporting the trays or objects along the conveyor in a machine direction that corresponds with a conveyor path. For certain applications, the conveyor is driven by an index drive device that indexes the conveyor by predetermined amounts with rests in between subsequent drive actions. Alternatively, in another aspect of the present invention, the conveyor is driven continuously.

In another aspect of the present invention, a supply device is preferably supported in a position along the conveyor path for supplying a dough product to the conveyor. For certain applications, the apparatus may include a driven cutoff mechanism for slicing the supplied dough product after a predetermined length of dough product is supplied. Preferably, a driven subframe is supported from the support frame such that it may move independently from the subframe and is positioned along the conveyor path. Preferably, the subframe may move the tray or object carried by the conveyor to a position with respect to the supplying device for receiving supplied dough product from the supplying device. Preferably, the apparatus further comprises a control system to move the subframe to deflect a portion of the conveyor based upon a desired position of the discrete object with respect to the supplying device.

In another aspect of the present invention, the subframe further includes an object holding means for creating a positive holding force for holding the tray or object against the conveyor while the dough products are being placed on the tray or object. Preferably, the object holding means comprises a pressure differential means comprising a vacuum chamber supported by the subframe and creating a plenum positioned adjacent to the conveyor. Preferably, the plenum has at least one opening by which vacuum pressure differential can be applied to a surface of the discrete object.

A method in accordance with the present invention is characterized by including the steps of conveying a discrete object along a conveyor path by way of a driven conveyor; supplying dough product to the conveyor from a position along the conveyor path from a driven supplying device; and deflecting at least a conveyor portion from a normal transport position to a position relative to the supplying device while the discrete object is positioned at least partially for receiving dough product from the supplying device and moving the conveyor portion back to a predetermined transport position while providing a positive holding force acting to urge the discrete object toward the conveyor.

A method in accordance with the present invention is also preferably characterized by providing a driven subframe for selectively deflecting the conveyor portion relative to the supplying device and for moving the conveyor portion back to a predetermined transport position. The step of providing a positive holding force may be performed by applying a vacuum pressure differential to a surface of the discrete object. Preferably, the step of conveying the discrete object is done as a series of indexed movements with rests in between wherein supplied dough is deposited onto the discrete object. The method may also comprise a step of cutting the dough product after a predetermined amount of dough product has been supplied and depositing a dough product slug onto a surface of the discrete object. Preferably, the discrete object is a tray. A plurality of discrete objects or trays may be conveyed in sequence along a single conveyor path or along a plurality of substantially parallel conveyor paths for receiving dough product from a multi-head supplying device at the same time.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this specification, illustrate several aspects of the invention and together with the description of the preferred embodiments, serve to explain the principles of the invention. A brief description of the drawings is as follows.

DETAILED DESCRIPTION OF THE PREFERRED EMBODIMENTS

Figure 1:
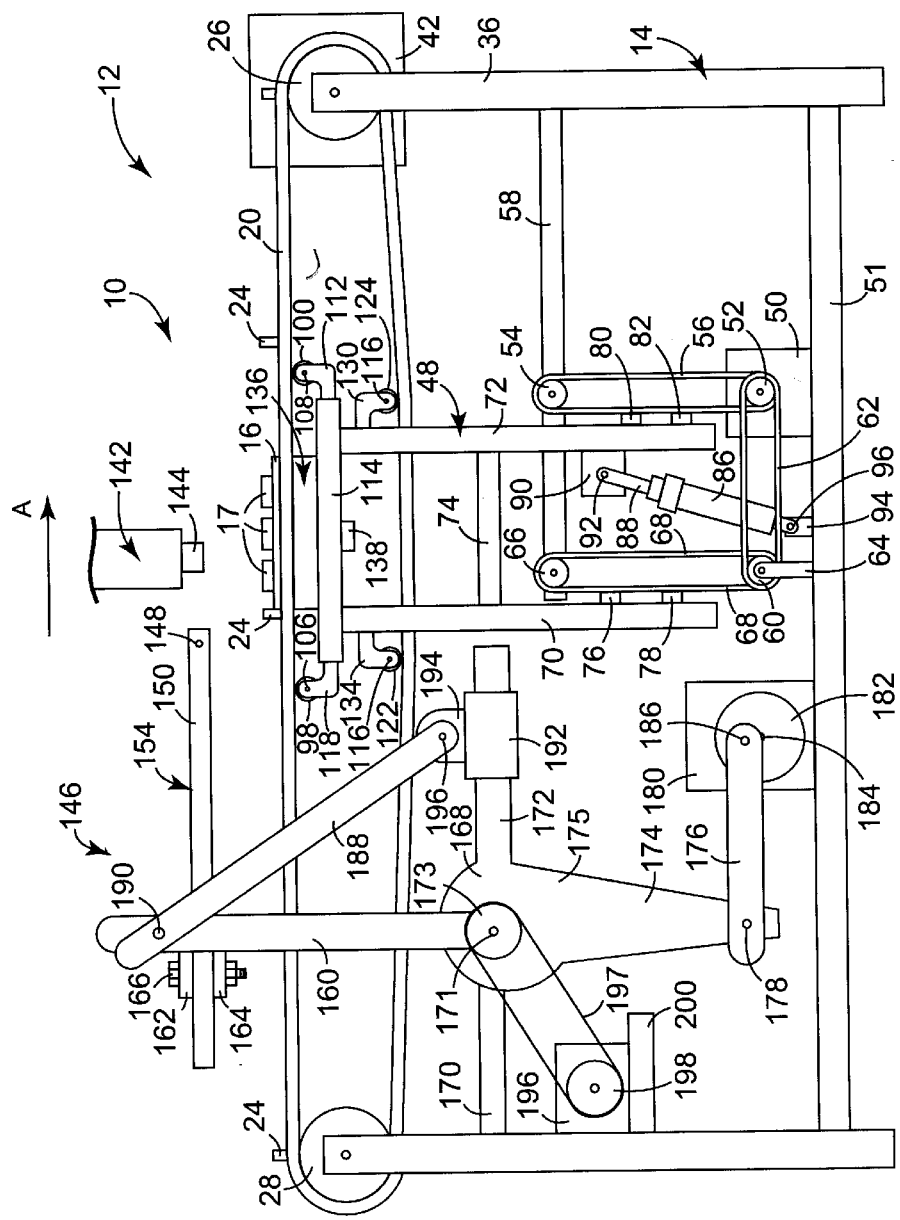
FIG. 1 is a schematic side view of a cookie dough processing system in accordance with the present invention showing a conveyor system for moving trays for receiving cookie dough slugs through the processing system, a subframe for lifting the trays to a dough supplying device, and a cut off device for portioning the cookie dough into individual cookie dough slugs.

With reference to the Figures, wherein like components are labeled with like numerals throughout the several Figures, a cookie dough processing system 10 is illustrated in FIG. 1. The processing system 10 preferably includes a computerized motion control system 11, illustrated schematically in FIG. 14, for controlling the movements of the processing system 10 as will be described in detail below.

The processing system 10 preferably includes a multi-lane conveyor system 12, operatively supported on a frame support structure 14, for carrying a series of (or any discrete) objects for receiving dough products in accordance with the present invention through the processing system 10 in a processing direction indicated by arrow A. As illustrated throughout the Figures, the discrete objects that receive dough product can comprise trays 16, such as comprised of paperboard coated for easy release. However, the present invention is particularly applicable to any discrete object having a surface onto which dough product can be deposited. By discrete, it is meant having a definite and individual nature, as compared to indefinite length webs or materials intended to be divided from one another downstream. Such a discrete object can be any defined size of paper, sheet or material that can be individually conveyed through the apparatus 10. Preferably, the conveyor system 12 is used to advance a discrete object such as a tray 16 or a plurality of trays 16 in the process direction indicated by arrow A. For the sake of the further description, such discrete objects will be referred to as trays 16 with the understanding that any such discrete object may be utilized.

Figure 2:
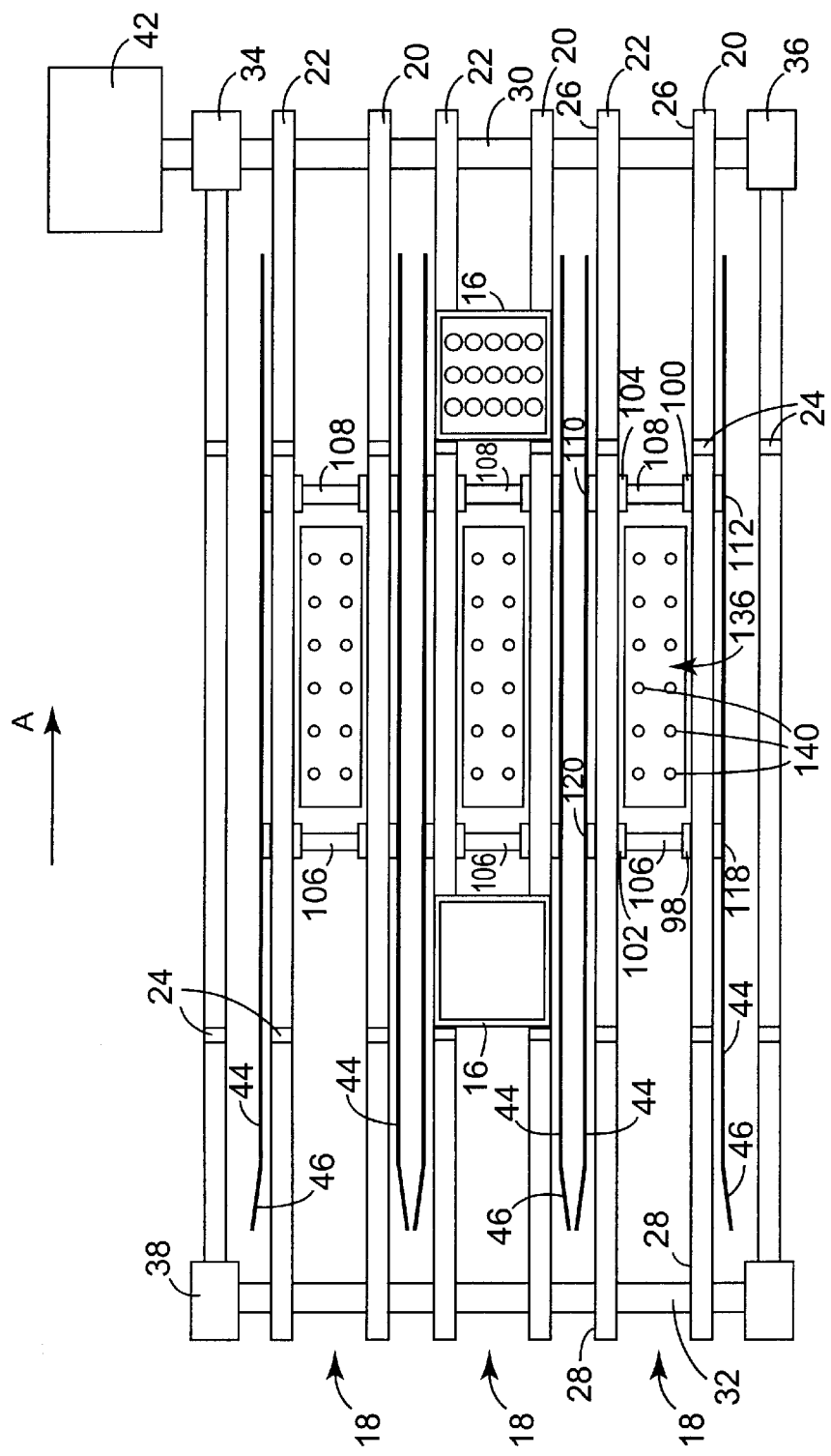
FIG. 2 is a partial top view of the cookie dough processing system of FIG. 1 showing in particular a three lane conveyor system, each including a plenum having openings for drawing air through the plenum and thereby creating a vacuum to secure the trays to the conveyor system.

As illustrated in FIG. 2, the conveyor system 12 preferably has multiple lanes 18 for simultaneously carrying multiple trays 16. It is understood that the conveyor system 12, in accordance with present invention, may consist of a single lane 18 or may have any number of lanes 18 such that the functional aspects of the present invention are accomplished. The illustrated conveyor system 12 comprises three lanes 18 and a preferred conveyor system 12 comprises six lanes 18. Each lane 18 preferably has a first conveyor belt 20 and a second conveyor belt 22. Preferably, as described below, the belts 20 and 22 are timing belts. That is, the belts 20 and 22 may be positively engaged to a drive sprocket so that no slippage occurs and the belts 20 and 22 may be synchronized together and moved in a repeatable and controllable manner. Preferably the belts 20 and 22 are parallel and are spaced apart by a predetermined distance such that a tray 16 may be operatively supported thereon as is shown in FIG. 2. That is, the spacing of the belts 20 and 22 is determined by the particular tray 16 that is used. The belts 20 and 22 may instead be any such transport mechanism, such as including moving belts, chains, or the like, or other stationary systems that drive objects by other means, such as, air or vibration, etc.

Further referring to FIG. 1, the belts 20 and 22 preferably include flights 24 for pushing the tray 16 in the process direction A as the belts 20 and 22 are moved. It is known than the flights 24 may be any such feature such that the functional aspects of the present invention are accomplished. That is, the flights 24 may be a feature of the belts 20 and 22 or the flights 24 may be a separate feature that many be attached to the belts 20 and 22. The flights 24 may be on both belts 20 and 22 or may be on one or the other of the belts 20 and 22. It is further understood that any device or feature that functions to advance the tray 16 in conjunction with the movements of the belts 20 and 22 in the process direction A may be used. For example, the tray 16 may be designed as having a recessed region that may engage with a raised region provided on either belt 20 or 22 or both. As another alternative, the tray 16 may be designed with a raised region that may engage with any recessed region or hole as part of either belt 20 or 22 or both.

As shown in FIG. 1, the belts 20 and 22 are preferably driven by drive sprockets 26. Sprocket, as used throughout this Application, means any wheel that has the ability to engage a belt, chain, or hole, or the like by using friction or a projection therefrom or the like, so as to provide positive engagement without substantial slippage. Further, belt, as used throughout this Application, means any belt or chain or the like, such as a timing belt for engaging to a sprocket and being moved thereby without substantial slipping.

In the preferred embodiment, the drive sprockets 26 are positioned at the output side of the processing system 10. As is illustrated in FIG. 2, the belts 20 and 22 also engage sprockets 28 at the side of the processing system that is opposite the drive sprocket 26 side. Preferably, as shown in FIG. 2, the drive sprockets 26 are attached to a common drive shaft 30 and the sprockets 28 are attached to an idler shaft 32. The sprockets 26 and 28 may be attached to the shafts 30 and 32 by any means such that the functional aspects of the present invention are accomplished. That is, the sprockets 26 and 28 may be permanently attached to the shafts 30 and 32 or may be releasably attached to the shafts 30 and 32 such that their both their linear and rotary positions may be adjusted.

Referring to a single lane 18, the pair of drive sprockets 26 for the belt 20 and 22 are preferably rotationally positioned on the shaft 30 so as to be synchronized in time with each other. Generally, this is important where both belts 20 and 22 include flights 24 that are integral with the belts 20 and 22. That is, proper timing of the sprockets 26 should be realized where the flights 24 are permanently positioned on the belts 20 and 22. It is noted that, where only one of the belts 20 and 22 includes flights 24 the need for timing of the sprockets 26 for a single lane 18 is lessened. Also, the pair of drive sprockets 26 for a single lane 18 may then not have to be synchronized with respect to each other on the shaft 30. As above, the flights 24 may be separately attached to the belts 20 and 22 so that the flights 24 can be linearly aligned as is illustrated in FIG. 2 after the belts are operatively supported in driving position.

For a multilane conveyor system such as the conveyor system illustrated in FIG. 2, it is preferable that all of the lanes 18 are timed together with respect to each other. That is, all of the drive sprockets 26 should be rotationally aligned with each other or all of the flights 24 should be linearly aligned with each other in accordance with the functional goals of the present invention. That is, each tray 16 carried by each lane 18 of a multilane system is preferably positioned at the same position along the process direction A at the same time. As such, a plurality of trays 16 may simultaneously receive a row of cookie dough slugs 17 having a predetermined position in each tray 16. The same approach may be utilized with respect to the sprockets 28 as they are attached to the idler shaft 32 for both a single lane 18 and for a multilane conveyor system.

As shown schematically in FIG. 2, the drive shaft 30 can be rotatably supported by a frame member 34 and a frame member 36. Likewise, the idler shaft 32 can be rotatably supported by a frame member 38 and a frame member 40. Preferably, the frame members 34, 36, 38, and 40 include rotational bearings or the like (not shown) for supporting the shaft 30 and 32 and for providing rotational capability to the shaft 30 and 32. It is contemplated that, either shaft 30 or shaft 32, or both, may include tensioning mechanisms (not shown) as are well known in the art for removing slack from the conveyor belts and for providing the correct operating tension.

Figure 14:
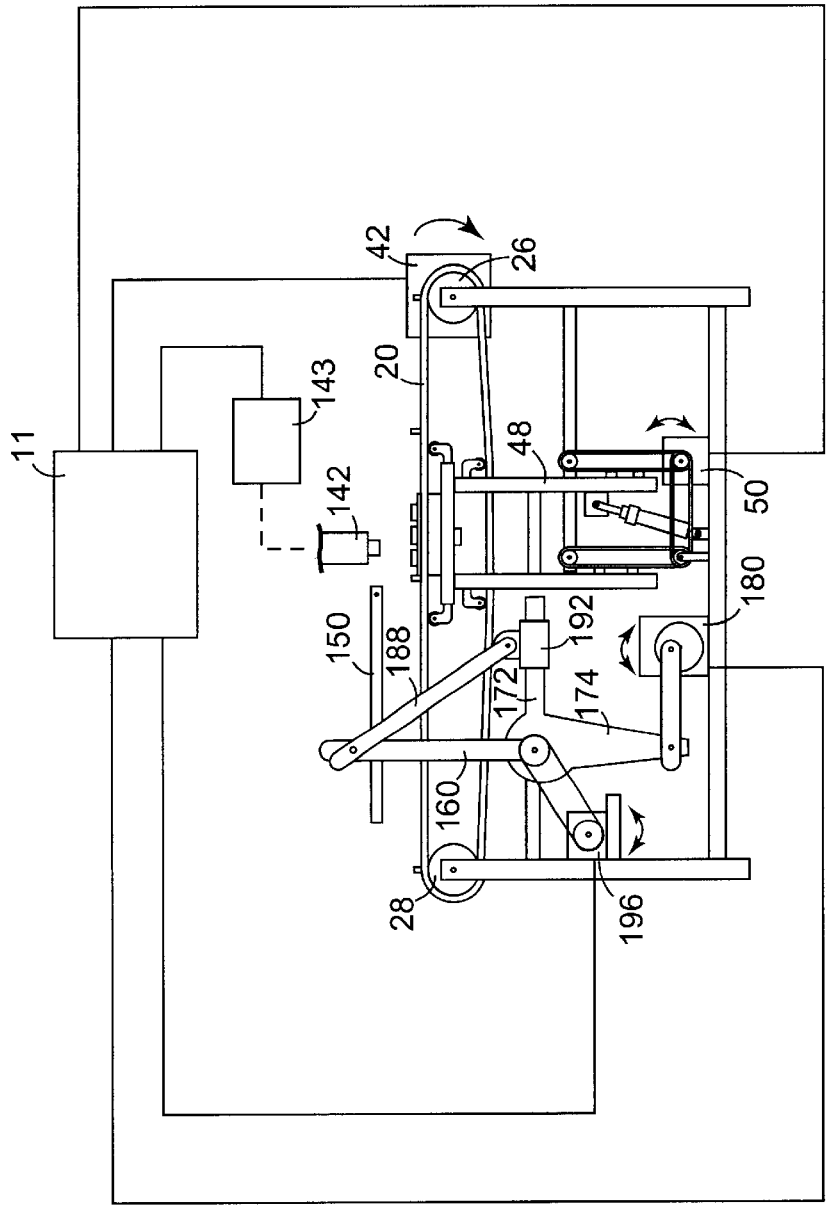
FIG. 14 is a schematic illustration of the processing system of FIG. 1 showing in particular a motion control system and the corresponding drive devices.

The drive shaft 30 is preferably driven by a drive comprising a motor 42. In a preferred embodiment, the motor 42 is functionally connected to and controlled by the motion control system 11 as is illustrated in FIG. 14. Preferably, the motor 42 is capable of providing indexing as well as continuous motion. That is, for certain applications, the motor 42 preferably rotates the shaft 26 and thereby rotates the sprockets 24 such that the flights 26 of the belts 20 and 22 are advanced to move the tray 16 in the process direction A by a predetermined distance. As described below, it is contemplated that the motor 41 may instead provide continuous rotational motion to advance the tray 16 in the processing direction A by a controlled distance. It is known that the motor 43 may be any type of servo motor or the like, but it is preferable that such motor be precisely controllable, such as by using conventional encoders or the like so that accurate distance control can be achieved.

Referring to FIG. 2, the conveyor system 12 preferably includes a pair of guide plates 44 functionally defining each of the lanes 18. In a preferred embodiment, the guide plates 44 extend parallel to and along the outside edge of belt 20 and belt 22 of a lane 18 thereby defining a guide channel and path of conveyance that extends in the process direction A. The guide plates 44 preferably extend as a continuous structure along the entire lane 18 of the conveyor system 12. That is, the guide plates 44 extend from a position where a tray 16 is introduced to the conveyor system 12 and continue to a position where a tray 16 is removed from the conveyor system 12. Alternatively, one or more guide portions can be arranged over only one or more portions of the lanes 18.

Preferably, the guide plates 44 are formed as a thin plate, for example the guide plates 44 may be formed from sheet metal or plastic, or any other material such that the functional aspects of the present invention are accomplished. The guide plates 44 may be utilized as multiple plates extending along a lane 18 as described above. In a preferred embodiment, the guide plates 44 are operatively attached by connecting structure (not shown) to a subframe 48 that is described in detail below. Preferably, the guide plates 44 extend above the surface of the belts 20 and 22 by a predetermined amount that generally depends upon the particular tray 16 that is used. That is, the guide plates 44 extend along the belts 20 and 22 and extend above the surface of the belts 20 and 22 such that a tray 16 is effectively restricted from moving laterally while moving in the process direction A.

Preferably, as is illustrated in FIG. 2, the guide plates 44 each include a lead-in feature 46 at the entry side of the conveyor system 12 where the empty trays 16 may be introduced. Preferably, the lead-in feature 46 extends angularly away from the guide plate 44 to guide trays 16 into the lanes 18. As shown in FIG. 2, lead-in features 46 of a pair of guide plates 44 of a lane 18 preferably provide a generally wider guide region for aligning trays 16 as they are introduced to the conveyor system 12. Proper positioning of the tray 16, both in the process direction A and in a lateral direction with respect to the process direction A, is especially important when the trays 16 are positioned to be conveyed through the system 10 so as to receive multiple rows of cookie dough slugs 17 that are positioned very near and adjacent to one another on the trays 16.

Referring to FIG. 1, the processing system 10 includes a subframe 48 that may move in a direction that is generally up and down and is used to raise and lower the belts 20 and 22 and thereby move the tray 16 in a direction generally perpendicular to the processing direction A. Such motion is preferably substantially linear, but it may instead include rotary motion at one or more points. A system used for moving the subframe 48 up and down preferably includes a drive such as motor 50 having a drive sprocket 52. In a preferred embodiment the motor 50 is functionally connected to and controlled by the motion control system 11 as is shown in FIG. 14. That is, the motor 50 may preferably provide for precise control over the motion of the subframe 48 by moving sprocket 52 by controlled rotation thereof. It is known that the motor 50 may be any type of motor or the like, again, preferably with precise motion motoring and control.

Preferably, the drive sprocket 52 may accommodate multiple belts as described below, such as stacking sprockets or the like upon one another of the same or different sizes. The drive motor 50 may be supported by a frame support member 51 or any other frame member such that the functional aspects of the present invention are realized. The drive sprocket 52 may be connected to an upper sprocket 54 by a belt 56. The upper sprocket 54 is preferably connected to and supported by a frame support member 58 so as to be rotatable therefrom. That is, the upper sprocket 54 may be attached to a shaft (not shown) that is attached to the frame support member 58 so as to allow the sprocket 54 to rotate. Further, it is known that any technique whereby the sprocket 54 is operatively attached to any functional frame member 58 such that it is rotatable may be used. The upper sprocket 54 may be connected to any frame member such that the functional aspects of the present invention are accomplished. Also, it is known that, any known or developed tensioning device for tensioning and removing slack from belt 56 may be utilized in combination with a sprocket 52 or the sprocket 54 or both as is well known in the art.

Further referring to FIG. 1, the drive sprocket 52 is preferably connected to a lower sprocket 60 by a belt 62. Preferably, the drive sprocket 52 has the capability to drive multiple belts (e.g. by stacking sprockets of the same or different sizes). That is, the drive sprocket 52 preferably drives both belts 56 and 62 simultaneously. The lower sprocket 60 may be rotatably supported by a support member 64 that is further connected to a frame support member 51. It is contemplated that, the lower sprocket 60 may be connected to any frame support member and that any bracket or device may be used such that the functional aspects of the present invention are realized. That is, the lower sprocket 60 may be mounted in any manner such that it is rotatable. Preferably, the lower sprocket 60 also has the capability to utilize multiple belts. That is, the belt 62 and a further driven belt 68 are preferably connected to the lower sprocket 60. Preferably, the lower sprocket 60 is connected to an upper sprocket 66 by the belt 68. The upper sprocket 66 may be connected to and supported by the frame support member 58. As above, it is contemplated that the upper sprocket 66 may be attached to any frame support member 58 by any technique such that it is rotatable therefrom. Further, any tensioning device either known or developed may be used in combination with the sprocket 60 or the sprocket 66 or both.

Figure 3:
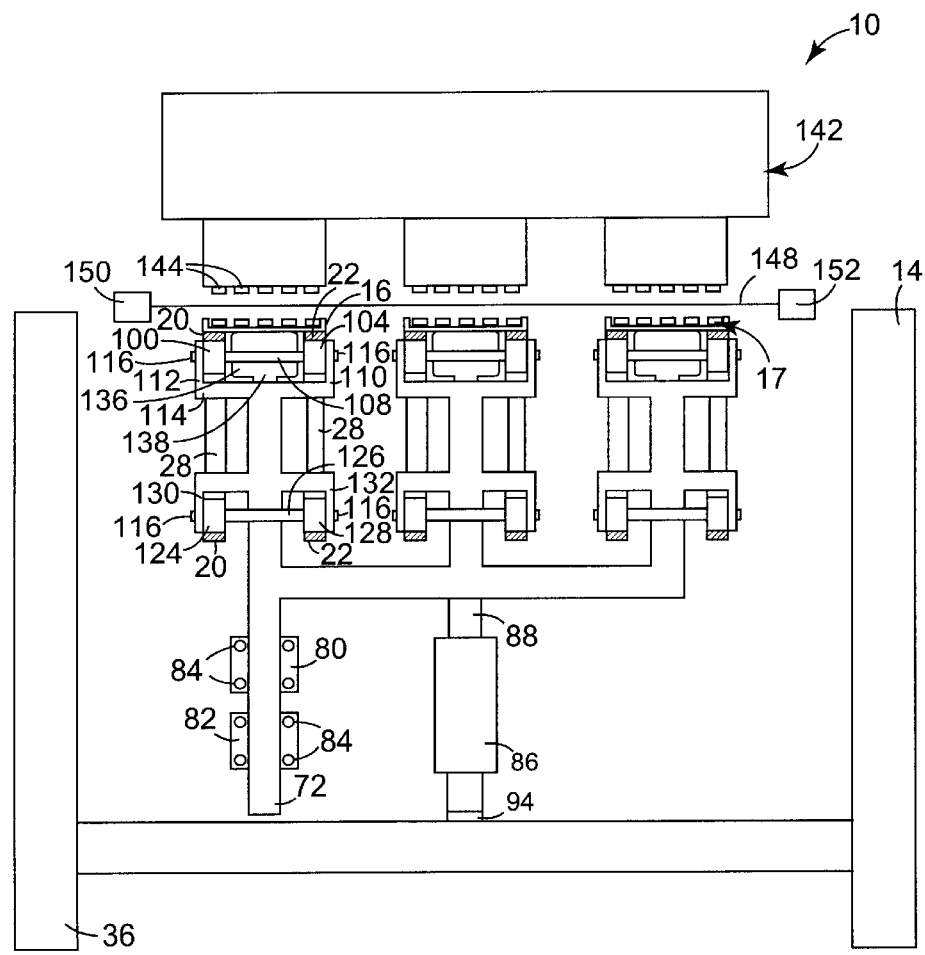
FIG. 3 is a partial front view of the cookie dough processing system of FIG. 1 taken in cross-section and showing a multilane cookie dough supplying device above a cut off blade for forming the individual cookie dough slugs and the subframe.

Referring to FIG. 1, the illustrated subframe 48 includes frame members 70 and 72. The subframe 48 further includes a horizontal frame member 74. Preferably, the frame member 70 is attached to the belt 68 by using brackets 76 and 78 as is shown in FIG. 1. Further, the frame member 72 is preferably attached to the belt 56 by using brackets 80 and 82. Referring to FIG. 3, the brackets 80 and 82 are illustrated with the belt 56 removed. The brackets 76 and 78 and the brackets 80 and 82 preferably are fixed with the frame members 70 and 72, respectively, and include mounting holes 84 for attachment to the belts 68 and 56, respectively, by using conventional fasteners or the like. It is contemplated that any such fastener may be used such that the functional aspects of the present invention are realized. Further, it is contemplated that any bracket may be used to connect the belt 56 and belt 68 to the frame member 72 and 70, respectively, such that the functional aspects of the present invention are realized. That is, any brackets, clamps, fixtures, or techniques, known or developed, for securing the belts 56 and 68 to the frame members 72 and 70, respectively, may be used.

Referring to FIG. 1, the subframe 48 preferably also includes a balancing cylinder 86 for supporting and balancing the weight of the subframe 48 and other attached components. Preferably, the balancing cylinder 86 is an air actuatable cylinder operatively connected with a pressurized air source (not shown) and having an extendable shaft 88. The extendable shaft 88 is shown pivotably connected to a bracket 90 fixed with frame member 72 at pivot point 92. Further, the opposite side of the balancing cylinder 86 is pivotably connected to a bracket 94 at pivot point 96. Preferably, the bracket 94 is connected to frame member 51 of the supporting frame structure 14. Brackets 94 may be connected to any frame member of the frame support structure 14 that is not moveable with subframe 48.

In a preferred embodiment and as shown in FIG. 1, the air cylinder 86 is mounted at an angle such that the shaft 88 of the balancing cylinder 86 urges the subframe 48 in both a generally upward direction against the force of gravity and in a direction along the process direction A thereby urging the subframe 48 against the belts 56 and 68. As such, the weight of the subframe 48 is supported by the air cylinder 86 and the subframe 48 is positively positioned against the belts 56 and 68 such that lateral movement is minimized. As a result, belts 56 and 58 can easily cause back and forth movement of subframe 48 with minimized inertial forces.

Referring to FIG. 1, the motion of the subframe 48 will be described. Preferably, an upward motion of the subframe 48 may be accomplished by rotating sprocket 52 with motor 50 in a clockwise direction as viewed from FIG. 1. The sprocket 60 also rotates in a clockwise direction thereby causing the subframe 48 to move upward under the motion of belts 56 and 68. Likewise, a counterclockwise rotation of the sprocket 52 will cause the subframe 48 to move downward. Preferably, the weight of the subframe 48 is balanced by the balancing cylinder 86 as described above and the belts 56 and 68 as attached to the subframe 48 generally are required only to displace the mass of the subframe 48. That is, the balancing cylinder 86 provides a constant force urging against the subframe 48 preferably overcoming the force of gravity of the subframe 48. The belts 56 and 68 preferably provide a force to displace the subframe 48 that is balanced with the force provided by the balancing cylinder 86. The balancing cylinder may otherwise provide a partial force to support any portion of the weight of the subframe 48 and that the belts 56 and 68 may be required to lift a portion of the weight of the subframe 48.

It is also contemplated that any other drive device or mechanism may be utilized, either known or developed, to move the subframe such that the functional aspects of the present invention are realized. For example, the subframe 48 may utilize guide rods and bearings as are well known in the art and any lifting means such as an air cylinder, hydraulic cylinder, or a linkage mechanism and motor arrangement. Additionally, to provide substantially linear movement, a rack and pinion drive or scissor linkage could be used. For motion with rotary movement, a swing arm or four-bar linkage may be used.

Referring to FIGS. 1 and 2, the subframe 48 preferably includes a pair of upper rollers 98 and 100 for supporting belt 20 and a pair of upper rollers 102 and 104 for supporting belt 22 of each lane 18. Preferably, rollers 98 and 102 are freely rotatably supported by a shaft 106 and rollers 100 and 104 are freely rotatably supported by a shaft 108. Referring to FIGS. 2 and 3 the shaft 108 preferably extends between flanges 110 and 112 of a frame support member 114 and is attached to flanges 110 and 112 using any conventional technique. Support member 114 is operatively fixed with the subframe 48. Preferably, the shaft 106 extends between flanges 118 and 120 that are also attached to the frame support member 114. It is contemplated that, any shaft and bearing arrangement, as is well known in the art, may be used.

Referring to FIGS. 1 and 2, the subframe 48 also includes a pair of lower rollers 122 and 124 for guiding belt 20. As shown in FIG. 3, the roller 124 is freely rotatably supported by a shaft 126 that further freely rotatably supports a roller 128 for guiding belt 22. The shaft 126 is connected between flanges 130 and 132 that are operatively fixed with the subframe 48. The roller 122 is also freely rotatably supported by a similar shaft (not shown) with a second roller (not shown) for guiding belt 22 that are mounted between flanges 134 that are attached to the frame support member 70 of the subframe 48. As above, it is contemplated that any shaft and bearing arrangement, as is well known in the art, may be used such that the functional aspects of the present invention are realized.

Referring to FIG. 1, the motion of a belt, specifically belt 20, as a result of the upward and downward motion of the subframe 48 will be described. It is noted that the motion of the single belt 20 is preferably the same as the motion of the belt 22 and that belts 20 and 22 of each lane 18 preferably move simultaneously and in synchronization with one another. As such, reference will only be made to those components associated with belt 20 in describing such belt motion with respect to FIGS. 6 and 7 below. Preferably, the spaced pair of upper rollers 98 and 100 is spaced apart from the spaced pair of lower rollers 122 and 124 so that belt 20 is maintained in tension. In a preferred embodiment, upper rollers 98 and 100 are spaced apart from lower rollers 122 and 124 so that for a given length of belt 20, the upward and downward movement of the subframe 48 can be accommodated without stretching belt 20. As illustrated, spacing the upper pair of rollers 90 and 100 from the lower pair of rollers 122 and 124 at a distance greater than the diameter of at least one of the sprockets 26 and 28 provides such a tensioning effect.

Figure 6:
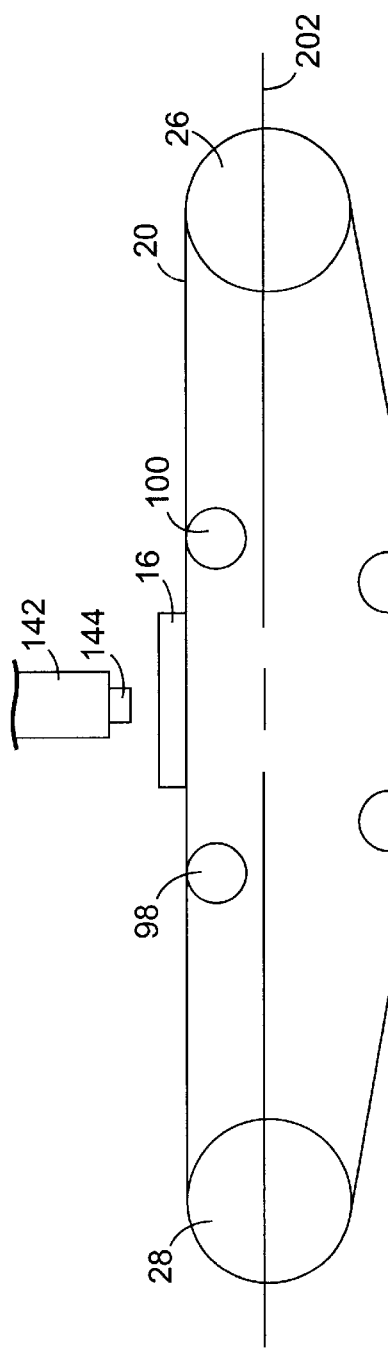
FIG. 6 is a schematic view of a conveyor system in accordance with the present invention showing the conveyor belt in a down position of the subframe.

Referring to FIG. 6, a schematic view of the conveyor system 12 is illustrated. In FIG. 6, a tray 16 is shown schematically positioned on the belt 20. Further, a cookie dough supplying device such as an extrusion device 142 and a stream of cookie dough 144 (described below) are shown positioned above the tray 16. Also, the sprockets 28 and 26 having a centerline 202 passing through their centers are illustrated. Further, the upper rollers 98 and 100, the lower rollers 122 and 124, and the belt 20 are illustrated in a down position of the subframe 48 in accordance with the present invention. That is, the upper portion of the belt 20 is in a normal transport position that is preferably generally horizontal such that the tray 16 may easily pass beneath the extrusion device 142. As illustrated, the lower rollers 122 and 124 are positioned at a distance away from the centerline 202 that is greater than the distance of the upper rollers 98 and 100 from the centerline 202. As such, the length of the belt 20 below the centerline 202 is greater than the length of the belt 20 above the centerline 202.

Figure 7:
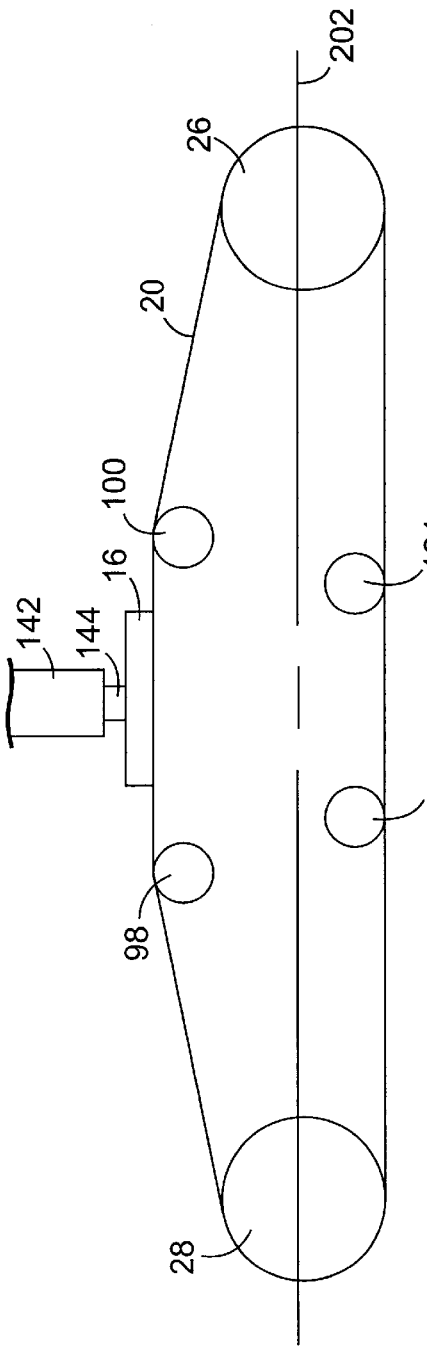
FIG. 7 is a schematic view of the conveyor system in accordance with the present invention showing the conveyor belt in an up position of the subframe.

Referring to FIG. 7, the schematic view of the conveyor system 12 of FIG. 6 is illustrated; however, the upper rollers 98 and 100, the lower rollers 122 and 124, and the belt 20 are illustrated in an up position of the subframe 48 moved toward the extrusion device 142 and in accordance with the present invention. As illustrated, the tray 16 is in a raised position such that it may receive a row of cookie dough slugs 17. As illustrated in FIG. 7 the upper rollers 98 and 100 are positioned at a distance away from the centerline 202 that is greater than the distance of the lower rollers 122 and 124 from the centerline 202. As such, the length of the belt 20 above the centerline 202 is greater than the length of the belt 20 below the centerline 202. That is, the extra belt length that was below the centerline 202 in the down position of FIG. 6 is now above the centerline 202 in the up position of FIG. 7. As a result, the belt 20 may be moved up and down without being stretched.

Figure 4:
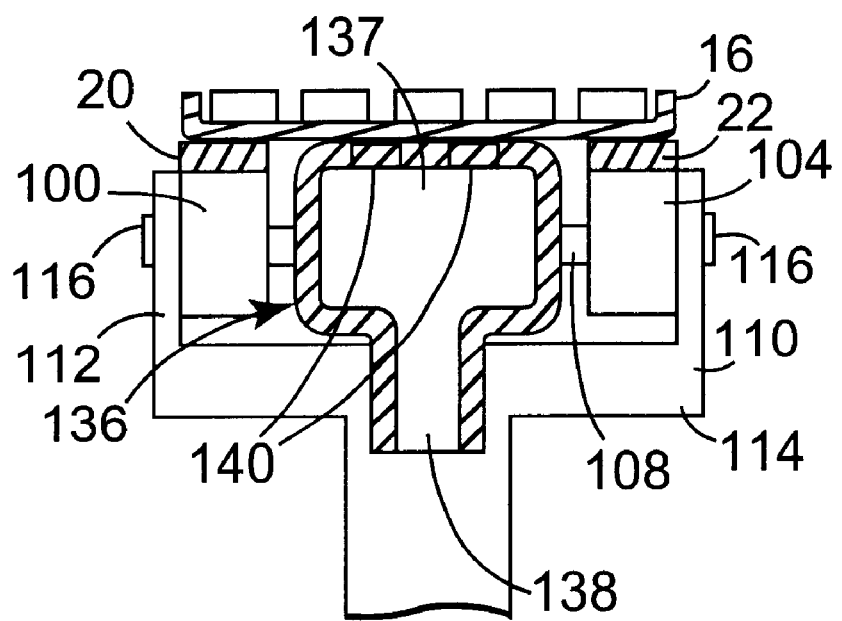
FIG. 4 is a partial cross-section view of a portion of the subframe of FIG. 3, showing in particular a plenum and the openings and showing a tray with cookie dough slugs held against the conveyor.

As shown in FIG. 1 the subframe 48 preferably further includes a plenum 136. Referring to FIG. 4, the plenum 136 is illustrated in a partial cross sectional view. Preferably the plenum 136 includes a chamber 137 for maintaining a predetermined flow volume as described below. The plenum 136 includes a port 138 for connecting to a vacuum generator or system (not shown). In FIG. 2, the plenum 136 is illustrated in top view. Preferably, the plenum 136 has a width permitting it to be positioned between the belts 20 and 22 and has a length that extends a predetermined distance in the process direction A such that the functional aspects of the present invention are accomplished. Specifically, it is preferable that the plenum 136 be sufficiently long to enhance holding a tray 16 against drive belts 20 and 22 over the course of depositing one or more rows of dough slugs 17 into such a tray 16 for a particular application.

As shown in FIGS. 2 and 4, the plenum preferably includes a plurality of openings 140 for allowing air to enter the chamber 137 of the plenum 136. The openings 140 may be any arrangement of openings such that the tray 16 is held against the belts 20 and 22 in accordance with the present invention. For example, the openings 140 may be a single row or multiple rows of openings, or may be a single opening having a perforated structure (such as a wire mesh or the like) incorporated therewith. Preferably the openings 140 have a size and shape such that a predetermined amount of flow volume may be realized in accordance with the present invention. That is, a flow volume that may hold a tray 16, or any other discrete or individual object for receiving dough, to the belts 20 and 22 in accordance with the present invention is preferred. It is noted that a tray 16 may cover some of the openings 140 or may cover all of the openings 140.

It is otherwise contemplated that any technique, known or developed, may be used to hold the tray 16 or any other receiving object in an operatively secure manner in accordance with the present invention such as mechanical, magnetic, or chemical means or combinations thereof. For example, air forced from above a tray 16 (that is, air flowing in the same direction as the supplied stream of dough 144) may be utilized to create a force of differential pressure against a tray 16 thereby urging the tray 16 against the belts 20 and 22. Further, it is contemplated that a mechanical device may be used to hold a tray 16 against the belts 20 and 22 such as a clamp or latch or the like including the use of magnetic materials and techniques. As a chemical means, a fluid having adhesive properties to hold the tray 16 in place may be introduced to the interface, such as through the openings 140. Preferably, however, the port 138 is attached to a vacuum pump or blower (not shown) or the like such that air may flow through the openings 140 to create a vacuum pressure differential to enhance holding or urge the tray 16 toward the belts 20 and 22. As such, the tray 16 may be securely held in a predetermined position.

As shown in FIG. 1, the processing system 10 preferably includes a supplying device such as the extrusion device 142 for extruding a continuous stream of dough product 144. It is noted that various devices may be used to form the cookie dough slugs such as known or developed extruders, depositors, formers, and the like. Preferably the extrusion device 142 includes a motor 143 operatively connecting the motor 143 and the motion control system 11 as shown in FIG. 14. A supplying device such as the extrusion device 142 may have multiple heads, as shown, each head also possibly having any number of supplying extrusion openings. Alternatively, the dough product may be supplied in a non-continuous manner such as with a roller former type supplying device, which is described in greater detail below.

Figure 5:
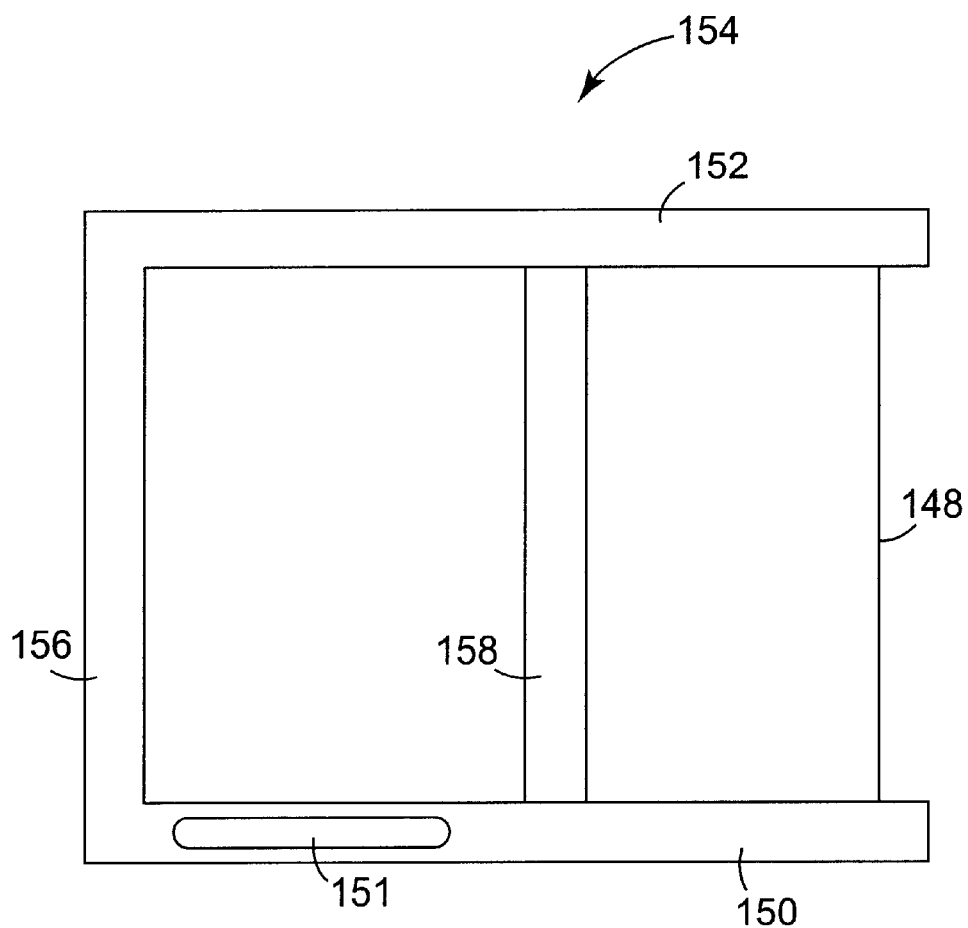
FIG. 5 is a top view of a frame for supporting a cutoff blade or wire in accordance with the present invention.

For certain applications, the processing system 10 preferably includes a cutoff device 146 for severing the stream of extruded dough product 144 and thereby forming individual slugs of cookie dough 17. Preferably, the cutoff device 146 includes a cutoff blade or wire 148. The blade or wire can be any conventional or developed blade or wire that may be sharp, serrated, heated, etc. to cut the dough extrusion. As illustrated in FIG. 5, the cutoff blade 148 may extend between a first support member 150 and a second support member 152 of a frame 154. The frame 154 may include a tensioning mechanism or device for maintaining the cutoff blade or wire 148 under tension. As shown in FIG. 3, the entire wire 148 can preferably cut all extrusions of dough by the multiple heads.

Preferably, the support member 150 includes a slot 151 for providing adjustment to the position of the frame 154 as described below. That is, the position of the cutoff blade 148 may be adjusted relative to the extrusion head 142. The frame 154 preferably includes cross support members 156 and 158. As is illustrated in FIG. 1 the frame 154 may be attached to a linkage member 160. The linkage member 160 preferably includes flanges 162 and 164 for connecting the frame 154 to the linkage member 160. As shown in FIG. 1, a bolt 166 preferably passes through holes (not shown) in the flanges 162 and 164 and passes through the slot 151 (as shown in FIG. 5) of the frame member 150 of the frame 154 adjustably connecting linkage member 160 to the frame 154. Any technique for attaching the frame 154 to the linkage 160 is contemplated, and it is preferable that the technique provides an adjustable connection.

As illustrated in FIG. 1 the cutoff device 146 further includes a pivotable elbow link 168 that is rotatably supported to the frame support structure 14 by a frame support member 170 at pivot 171. As illustrated in FIG. 1, the elbow link 168 includes a first arm portion 172 and a second arm portion 174 that are connected together by a pivot portion 175. The pivot portion 175 is pivotal about point 171 so that the first and second arm portions 172 and 174 move together about pivot point 171. Preferably, the second arm 174 is further pivotably connected to a horizontal link 176 at pivot point 178. The horizontal link 176 is further connected to a drive device 180 as described below. In a preferred embodiment the drive 180 is functionally connected to and controlled by the motion control system 11. The drive 180 may comprise a servo motor or the like and include a drive wheel 182 that is rotationally driven by the motor about the center point 184 of the drive wheel 182. As above, the ability to accurately monitor and control such motion is preferred as easily obtainable with conventional technology. Preferably, the linkage 176 is connected to the drive wheel 182 at a pivot point 186 that is offset from the center point 184 of the drive wheel 182. As such, rotation of the drive wheel 182 causes the linkage 176 to move back and forth in a generally horizontal direction. The pivot connections throughout these links can comprise any conventional manner.

Further referring to FIG. 1, the linkage 160 may also be pivotably connected to the frame support member 170 at pivot point 171. However, elbow link 168 and linkage 160 are rotatably supported to be independently moveable about pivot point 171. As illustrated in FIG. 1, the linkage 170 includes a sprocket 173 that is connected to a drive device, such as a motor 196 by a belt 197. In a preferred embodiment the motor 196 is functionally connected for accurate monitoring and control by the motion control system. Preferably, the motor 196 rotationally drives a sprocket 198 and is supported by frame 14, such as a frame member 200.

Preferably, the frame support member 170 includes a stationary shaft (not shown) operatively connected thereto that functions as pivot point 171. In a preferred embodiment, the elbow link 168 and the linkage 160 include rotational bearings or similar means as is well known in the art to provide support and rotation about the aforementioned stationary shaft attached to frame member 170. Preferably, elbow link 168 and linkage 160 may pivot about pivot point 171 independently from each other.

As described above, and referring to FIG. 1, the linkage 160 is functionally attached to the frame 154. The linkage 160 is further pivotably connected to a linkage member 188 at pivot point 190 as illustrated. The pivot point 190 may also be any conventional design. The linkage 188 is further connected, at an opposite end, to a linear slider 192 that slides along the first arm portion 172 of the elbow link 168. Preferably, the linear slider 192 includes a flange 194 for connecting to the linkage 188 at pivot point 196 as shown. In a preferred embodiment, the first arm portion 172 is a linear shaft for receiving a linear bearing as is well known in the art. The slider 192 may include linear bearings (not shown) for slidably moving along the horizontal arm 172. Any arrangement can be utilized for permitting guided movement of the end of link 188 along the first arm portion 172.

Referring to FIG. 1, the preferred motion capability of the cutoff device 146 will be described. In a preferred embodiment, the motor 196 may controllably rotate sprocket 198 and as a result rotate sprocket 173 via belt 197. The rotation of sprocket 173 causes linkage 160 to pivot about pivot point 171. As linkage 160 pivots about pivot point 171, linkage 188 may pivot about pivot point 190 and slider 192 may slide along horizontal arm 172. The resulting motion of the cutoff blade 148 may be substantially horizontal. That is, the length of linkage 160 may be such that a substantially horizontal movement of the cutoff blade 148 may be obtained over a predetermined distance such as required to sever the extruded stream of cookie dough 144.

Further referring to FIG. 1, the motor 180 may rotate the wheel 182 such that the link 176 moves in a substantially horizontal manner. Preferably, as the linkage 176 is moved in a substantially horizontal direction, the second arm portion 174 of the elbow link 168 is displaced as the elbow link 168 pivots about pivot point 171. The first arm portion 172 thus also rotates about pivot point 171, which movement is translated through slider 192 to link 188. This action may cause the cutoff blade 148 to move in a substantially vertical direction while the linkage 160 remains stationary with respect to elbow link 168. That is, sprocket 198 may be in a freely rotatable state or may be rotated by the motion control system 11 thereby allowing both the elbow link 168 and the link 160 to pivot about pivot point 171 together.

In a preferred embodiment, the substantially horizontal motion and the substantially vertical motion of the cutoff blade 148 are utilized in combination and to provide a predetermined path for the cutoff blade 148. That is, by utilizing the motions of the cutoff device 146 described above, separately or in combination thereof, a wide range of motion profiles for the path of the cutoff blade 148 may be accomplished. Again, such movements by controlled by the control system 11.

A preferred method of placing rows of cookie dough slugs 17 into trays 16 will now be described. Several trays 16, preferably three trays 16, are placed on the conveyor system 12 across the three lanes 18 in a position just prior to the lead-in feature 46 of the guide plates 44 and such that the flights 24 may advance the trays 16 along the process direction A. The trays 16 may be placed on the conveyor system 12 in any manner or automated manner, which itself is not a feature of the present invention. That is, the trays 16 may be placed on the conveyor system 12 by a human operator or by another conveyor or machine or the like. In a preferred embodiment, the trays 16 are placed on the conveyor system 12 by a pick and place machine as is well known in the art.

Preferably, the motor 42 comprises an indexing drive device that is controlled by the motion control system 11 and advances the trays 16 along the process direction A in predetermined discrete increments for use with an extrusion type supplying device. It is noted that the motion may be continuous such as for use with a roller former type supplying device as is described below. Any known or developed technique may be used to identify the position of a tray 26 at a given point in the process. For example, a laser sensor or the like may be used to communicate the location of a tray 16 to the motion control system 11. Otherwise, a specifically monitored and controlled belt drive with information of flight 24 position and tray 16 size can be sufficient to track tray 16 location. Preferably, the trays 16 are advanced a predetermined degree while beneath the extrusion device 142 and momentarily stopped so that they may simultaneously receive a row of cookie dough slugs 17. Preferably, the trays 16 are advanced by a larger increment in between each tray 16. It is noted that the trays 16 may be advanced by a multiple of the increment between the rows 17. That is, the distance between trays 16 may be such that the trays 16 are separated by a multiple of the distance separating rows of cookie dough slugs 17. Preferably, the trays 16 are urged toward the belts 20 and 22 by the vacuum created within the plenum 136 and transferred to the trays 16 by openings 140. As is described below, the process further includes moving the trays 16 up and down by moving the subframe 48, as described above, and further includes moving the cutoff device 146 to form individual rows of cookie dough slugs 17. Each of these motions is preferably precisely controlled to avoid collision of the dough 144 or cutoff blade 148 with the trays 16 while effectively depositing the cookie dough slugs 17.

In FIG. 14, a schematic of the processing system 10 showing the motion control system 11 and a schematic illustration of connection to the drives of the processing system as described above. It is contemplated that the motion control system may be any electrical system for connecting to and controlling the relative movements of motors or movement means. That is the control system may be any control system, such as a microprocessor, CPU, or programmable logic controller based system or any other logic based control system either known or developed such the functional goals of the present invention are realized. Preferably, a computer control system is used including an interface by which the timing aspects can be input and/or changed. It is contemplated that the drives may be servo motors or any such movement means either known or developed, such as air or hydraulic cylinders, electronic switches and actuators, and the like. As above, precise controls and sensors are preferably included with each drive to provide and react to signals of the computer control system.

Figure 8:
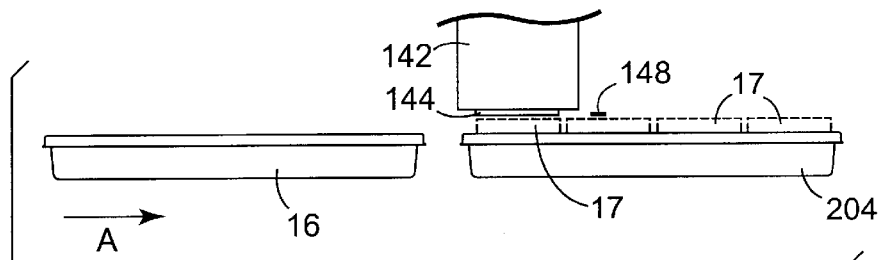
FIGS. 8–13 illustrate schematically the motions of the trays and the cutoff blade with respect to the cookie dough supplying device for a typical cycle used for placing cookie dough slugs in a tray.

In FIGS. 8–13, the timing of a process of placing rows of cookie dough slugs 17 into trays 16 is illustrated schematically. Referring to FIG. 8, a completed tray 204 is illustrated in the up position of the subframe 48 as described above and having four rows of cookie dough slugs 17 deposited therein. The cutoff blade 148 is illustrated as having just passed through the continuously extruding streams of cookie dough 144 and thereby creating the individual cookie dough slugs. Further, an empty tray 16 is illustrated as next to be filled.

Figure 9:
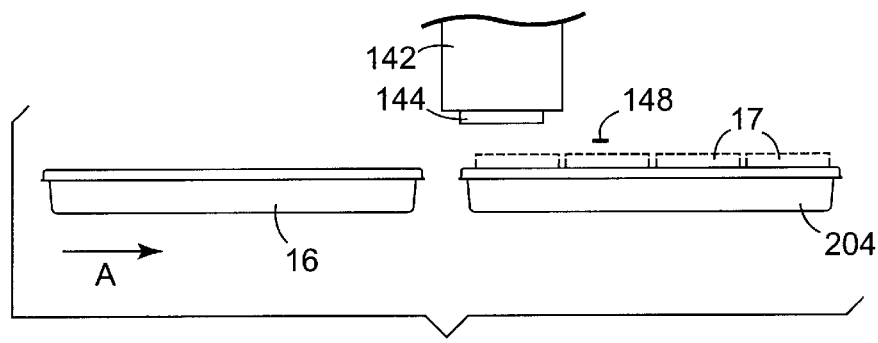

Referring to FIG. 9, the completed tray 204 is illustrated in a position below that of FIG. 8 and continuing along the process direction A. That is, the completed tray 204 and the empty tray 16 are being advanced along the process direction A while the subframe is lowered away from the extrusion device 142. Whereas this is an index to a new tray, the index distance is larger than for adjacent rows. Also, the extruded dough 144 is continuously being extruded as shown. As described below with respect to a roller former type of supplying device, the dough may be extruded or supplied in discrete amounts. That is, the extrusion may be pulsed such that a slug of dough is formed with or without the use of a cutoff blade such as the cutoff blade 148 to interrupt the extruding dough. The present invention contemplates that any dough supplying or providing device may be used that is capable of providing dough in discrete amounts. Further, it is contemplated that the cutoff blade 148 or the like may be used to assist in forming dough slugs under conditions of non-continuous extrusion. Further, the cutoff blade 148 is shown in a position near the end of its stroke along the process direction A but lower than the position of FIG. 8. That is, the cutoff blade 148 is preferably lowered so that it will not collide with the extruding dough 144 while it is retracted.

Figure 10:
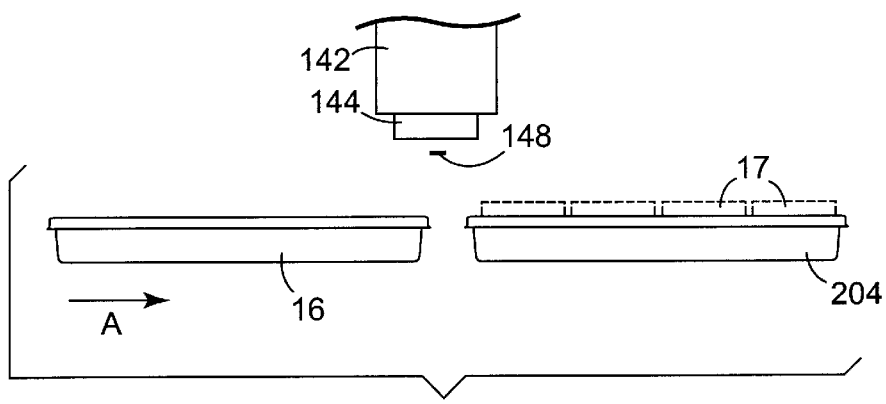

Referring to FIG. 10, the completed tray 204 and the empty tray 16 are shown continuing along the process direction A still during the same index movement and in the down position of the subframe 48. In this position, the cutoff blade 148 is partially retracted, but is maintained sufficiently below the dough extrusion. That is, the cutoff blade 148 is moving in a direction opposite that of the process direction A by moving back and down by controllably moving links 160 and 168.

Figure 11:
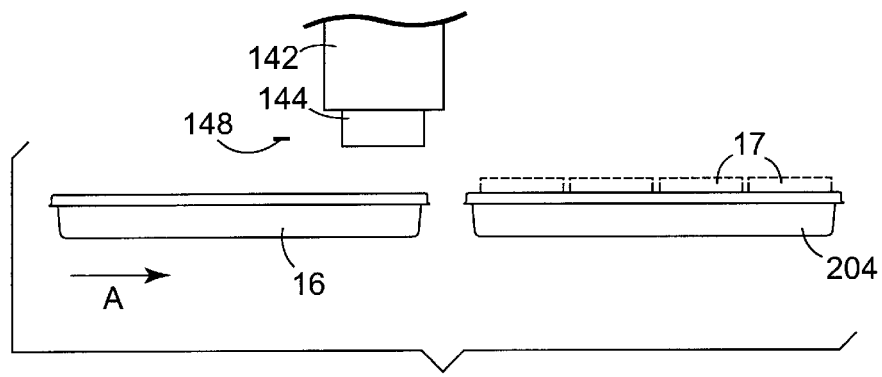

Referring to FIG. 11, the empty tray 16 has been indexed forward to a position along the process direction A where a first row of cookie dough slugs 17 may be deposited in the new tray 16. Also, the new tray 16 is moving upward while the dough 144 is continuing to be supplied from the extrusion device 142. In this position, the cutoff blade 148 is moving upward to get in position for a next cut as it has fully cleared the extrusion.

Figure 12:
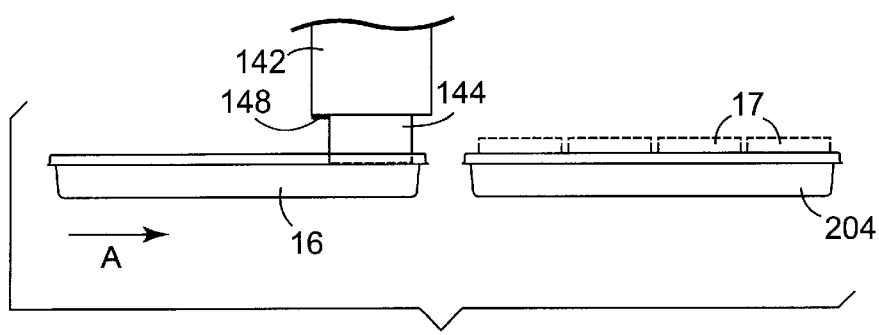

Referring to FIG. 12, the tray 16 is in the same indexed position along the process direction A and as is shown in FIG. 11. That is, the index motion is complete for this cycle. The cutoff blade 148 is illustrated now fully raised and coming forward at the beginning of the cutoff stroke through the dough extrusions.

Figure 13:
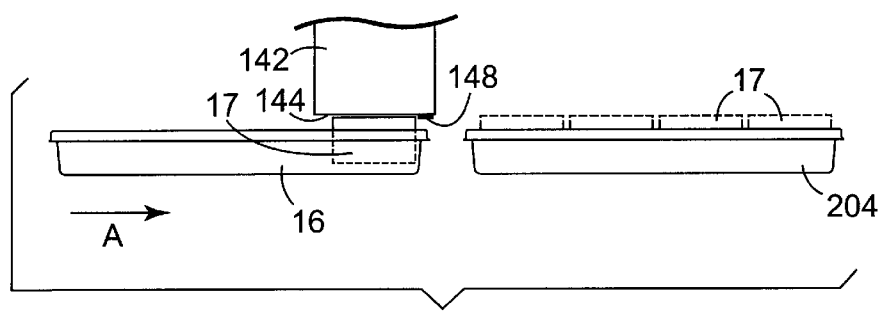

Referring to FIG. 13, the tray 16 is shown in the same indexed position along the process direction A and as is shown in FIGS. 11 and 12. The extruded dough 144 is illustrated in contact with the bottom of tray 16 and the cutoff blade 148 is illustrated as having just passed through the extruding dough 144 to form a first row of cookie dough slugs 17 in the new tray 16. The next cycle proceeds in the same manner (except that the indexed movement is less so that a next row of slugs 17 are deposited adjacent to the first row and so on).

In summary, as a tray 16 is approaching the location to place a row of cookie dough slugs 17 therein, the tray 16 is also being lifted to a predetermined vertical position to form the row of slugs of dough 17 in the tray 16. The vertical position preferably permits the dough to contact with the bottom of the tray but not to compress it after being severed by the cutoff blade 148. The cutoff blade 148 is also moving in relation to the extruding dough 144 and the tray 16. As schematically illustrated above in FIGS. 8–13, the motion of the cutoff blade 148 is preferably a circular cycle that is horizontal or slightly ascending when severing the extruding dough 144. Preferably, the cutoff blade 148 drops vertically while retracting such that it does not collide with the extruding dough 144.

Figure 15:
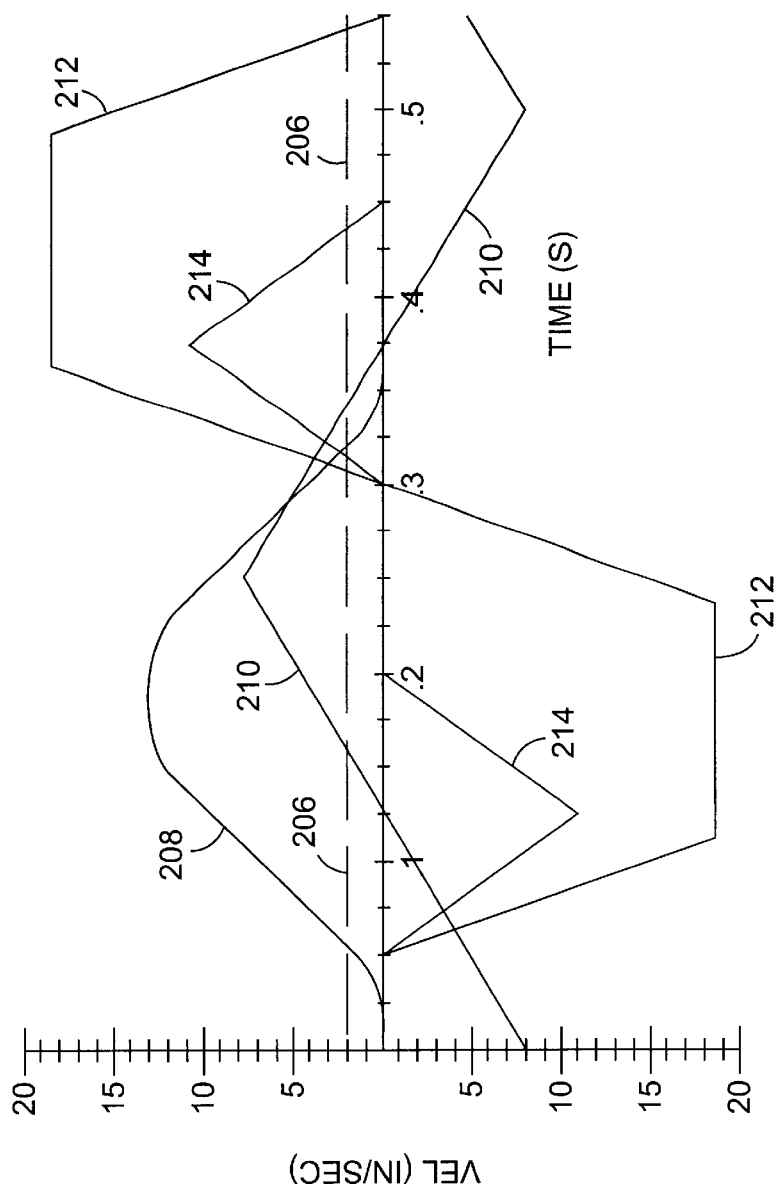
FIG. 15 is a graphical representation of the motion cycles for the conveyor, subframe, cutoff blade and dough supply.

In FIG. 15 exemplary motion profiles for the motion of the tray 16 and the cutoff blade are shown with respect to time and velocity. It is noted that motion above the time axis is in a first direction while motion below the time axis is in a second direction, generally opposite that of the first direction. Line 206 shows the dough extrusion at a constant velocity. That is, dough is extruded as a continuous stream. Line 208 shows the tray index profile. As is shown in the tray index profile 208 of FIG. 15, the tray preferably accelerates at a constant rate then smoothly begins to decelerate at a constant rate and is then stationary (zero velocity) as the dough is placed in the tray. It is noted that the direction of the tray index does not reverse and as such the profile line 208 is only shown above the time axis. Line 210 shows the tray lift profile. That is, the up and down movement of the subframe 48. Preferably, as shown, the tray 16 accelerates and then immediately decelerates to its maximum up position and then similarly returns to the down position. Line 212 shows the horizontal component of the cutoff blade 148 and line 214 shows the vertical component of the cutoff blade 148.

Figure 16:
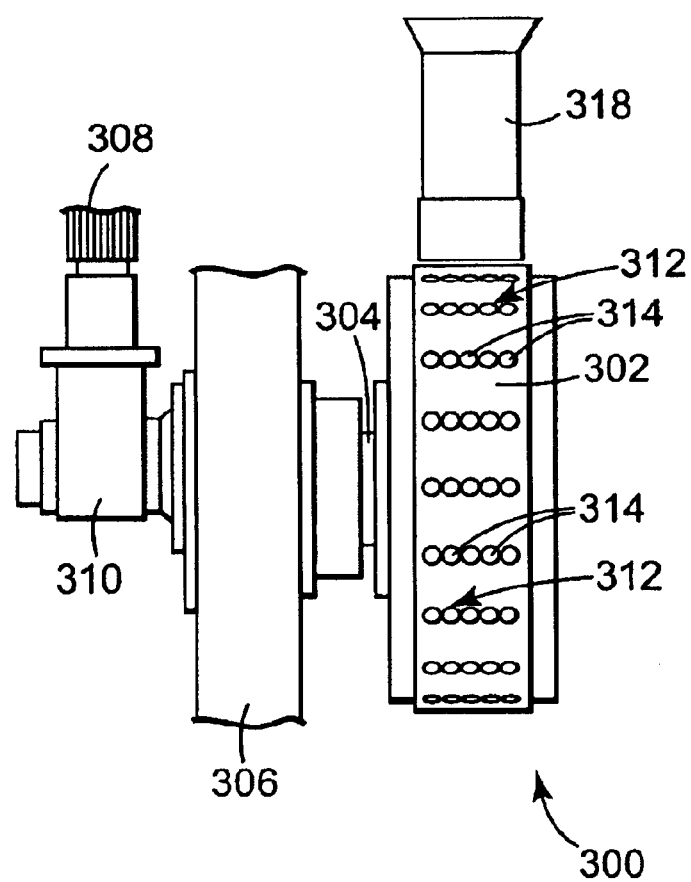
FIG. 16 is a partial front view of a roller former type cookie dough supplying device in accordance with the present invention.

As mentioned above, various devices may be used to form the cookie dough slugs 17. For example, a roller former type extrusion device 300 is illustrated in FIG. 16 that may be used to form cookie dough slugs in accordance with the present invention. One such extrusion device is commercially available as type W 800-200 from Hosokawa Bepex GmbH of Leingarten, Germany. The extrusion device 300 generally comprises a rotatable cylinder 302 mounted on a spindle 304, which spindle is supported by a support structure 306. The spindle 304 is driven by a motor 308, which includes a gearbox 310. Accordingly, the rotatable cylinder 302 may be rotated at any desired rate to extrude and deposit cookie dough slugs in accordance with the present invention as described below.

The rotatable cylinder 302 includes rows 312 of individual shaping cavities 314 for forming the cookie dough slugs 17. In operation, the rotatable cylinder 302 rotates continuously to supply cookie dough slugs from the shaping cavities 314 and deposit or place the cookie dough slugs onto a moving surface or into an object such as the tray 16. As illustrated, each row 312 includes five individual generally circular shaping cavities 314. Any desired number of shaping cavities 314 may be used for each row 312 and the shaping cavities 314 may be formed in various sizes and shapes to form different products. A row 312 of shaping cavities 314 may comprise shaping cavities 314 of the same size and shape or may comprise shaping cavities 314 of varying sizes and/or shapes.

Each of the shaping cavities 314 of the extrusion device 300 preferably includes a plunger 316 (see FIG. 18), which is capable of pushing or extruding a slug of dough out of a shaping cavity 314. Generally, each of the plungers 316 of a row 312 of shaping cavities 314 is actuated simultaneously to supply a complete row of cookie dough slugs 17. The shaping cavities 314 are filled with a product such as cookie dough by supplying the cookie dough to a hopper 318, which includes a loading device (not shown) that fills the shaping cavities 314 with cookie dough, usually by a pressurized feed roller or the like. The hopper 318 also typically includes a scraping device (not shown), which scrapes excess dough (that comes from filling the shaping cavities 314) from the outer surface of the rotatable cylinder 302 and recycles the excess dough back to the hopper 318.

Figure 17:
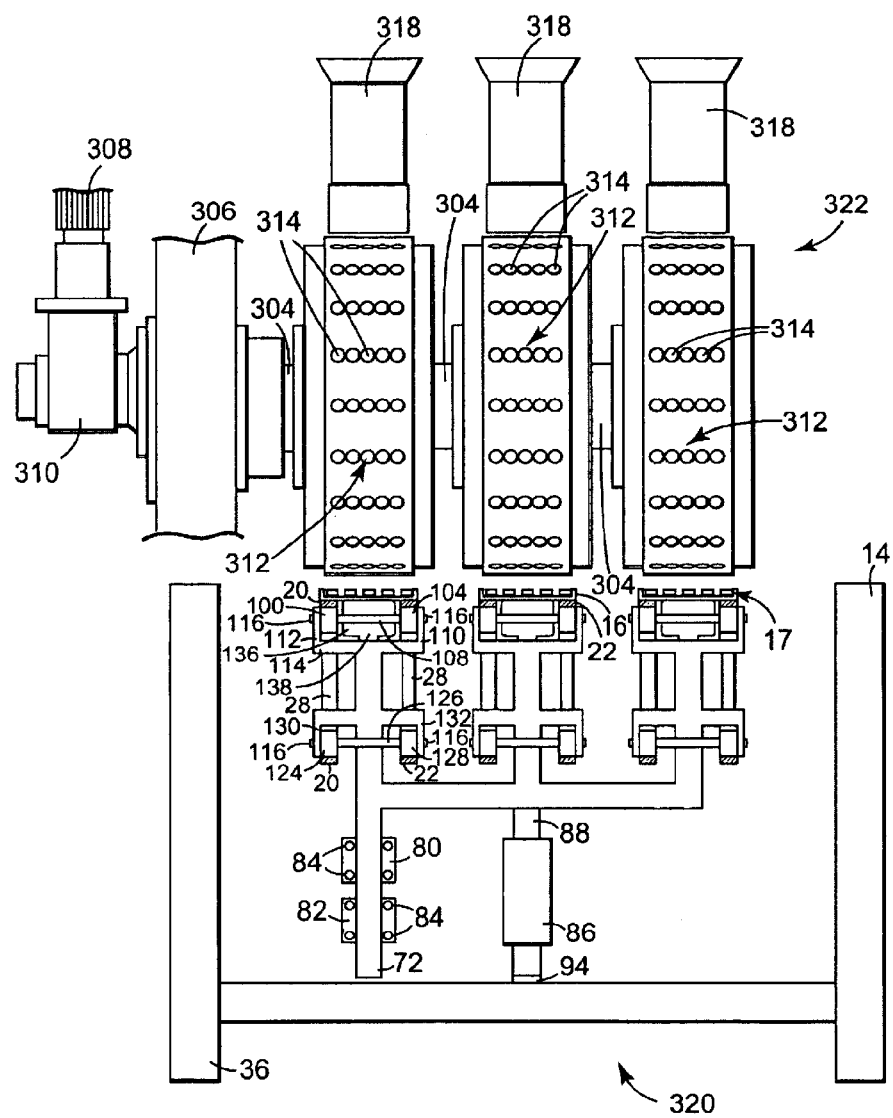
FIG. 17 is a partial front view of the cookie dough processing system of FIG. 3 and showing a multilane roller former type cookie dough supplying device positioned above the processing system.

In FIG. 17 a partial side view of a processing system 320 is shown, which is based on the processing system 10 of FIG. 1 wherein a multilane roller former extrusion device 322 has been substituted for the extrusion device 142. The multilane roller former extrusion device 322 is based on the roller former type extrusion device 300 shown in FIG. 16 and, as shown, includes three rotatable cylinders 302 mounted on a common spindle 304. However, it is understood that any number of rotatable cylinders may be used in a processing system 320 in accordance with the present invention. It is further contemplated that a single rotatable cylinder 302 having shaping cavities 314 aligned to individual lanes of a multilane system may be used. That is, multiple rotatable cylinders 302 positioned on a common spindle or axle are not required. Also, because the roller former extrusion device 322 is capable of forming complete cookie dough slugs, the cutoff device 142 of the processing system 10 may not be required and may be omitted.

Figure 18:
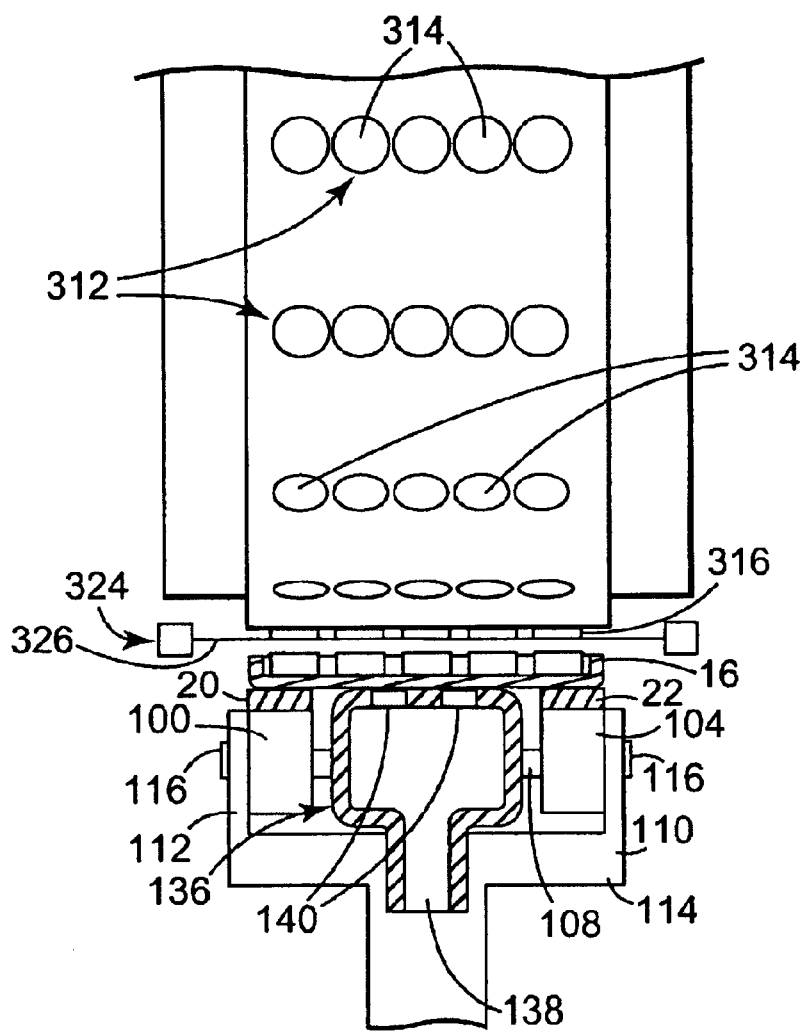
FIG. 18 is a partial cross-section view of a portion of the processing system of FIG. 17 and showing in particular a row of cookie dough slugs which have been deposited in the tray by the roller former type supplying device.

A portion of a single lane of the processing system 320 is shown in greater detail in FIG. 18 and shows a row 17 of cookie dough slugs that has been deposited into the tray 16. In operation, as the rotatable cylinder 302 rotates, the plungers 316 extend to push the cookie dough slugs out of the shaping cavities 314. Because the cookie dough is usually sticky and because the cookie dough is usually forced into the shaping cavities 314 with some pressure, the cookie dough slugs may stick or adhere to the plungers 316. Thus, a separating device 324, which as illustrated comprises a wire 326, is used to separate the cookie dough slugs from the plungers 316 as the rotatable cylinder 302 rotates to deposit cookie dough slugs. It is noted that the plungers 316 are illustrated as extending out of the shaping cavities 314 and slightly beyond the outside surface of the rotatable cylinder 302 but may be generally flush with the outside surface of the rotatable cylinder 302 or even slightly retracted.

In accordance with the present invention, a roller former type extrusion device such as the extrusion device 300 or 322 described above may be used to deposit cookie dough slugs onto a discrete object such as the tray 16 as a continuous process. That is, the rotatable cylinder 302 preferably rotates continuously and the conveyor belts 20 and 22, which carry the tray 16, preferably move linearly in a continuous manner as opposed to an indexing type of motion. The speed of the belts 20 and 22 is preferably timed with respect to the rotational motion of the rotatable cylinder 302 such that a desired spacing between the rows of cookie dough slugs is obtained.

For certain applications the tray 16 may be translated in an up and down direction in order to provide clearance between the cookie dough slug and the tray 16. One preferred tray in accordance with the present invention includes a lip or raised portion, which is provided around the periphery of the tray 16. As the tray 16 moves under the rotatable cylinder 302, the rotatable cylinder is rotating toward the wire 326 of the separating device 324 and pushing the row of cookie dough slugs to be placed in the tray 16 out of the shaping cavities 314. The cookie dough slugs are fully extended just before the cookie dough slugs are separated from the plungers 316 by the separating device 324. The leading lip of the tray 16 is already past the extruding cookie dough slugs as they move into position to be separated from the plungers 314 and cannot interfere with the cookie dough slugs. In other words, the leading lip is slightly ahead of the row of cookie dough slugs to be deposited The trailing lip of the tray 16 may, however, interfere with the extruding cookie dough as the cookie dough slugs are moving toward the separating device 324. For example, in one aspect of the present invention a preferred tray may be sized to hold four rows of cookie dough slugs, wherein each row comprises five cookie dough slugs. Generally, the first two rows of cookie dough slugs may be deposited in the tray 16 with the tray in a raised or up position. That is, the tray 16 is in a position such that the cookie dough slugs are contacting the tray 16 and being separated from the plungers 316 at about the same time. As the third row of cookie dough slugs is moving into position to be deposited in the tray 16, the trailing lip of the tray may be able to slightly interfere or bump the extruding cookie dough slugs. The tray 16 may be correspondingly moved down so as to be out of the way of the cookie dough slugs and then moved back up to receive the cookie dough slugs. Accordingly, when the fourth row of cookie dough slugs is moving into position to be deposited into the tray 16, the tray may need to be similarly moved to avoid a collision between the trailing lip of the tray 16 and the cookie dough slugs. The above described method may be applied to any tray and cookie dough slug configuration in order to avoid collisions and the timing and amount of motion required may be determined empirically for each tray and cookie dough slug configuration. As such, the present invention provides apparatuses and methods wherein dough based products such as cookie dough slugs may be deposited or placed onto a wide variety of discrete objects such as sheets or lipless trays as well as trays with peripheral lips or the like.

The present invention is not limited to the above described preferred apparatus. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

What is claimed is:

1. An apparatus for depositing a dough product onto a discrete object that is transported through the apparatus, the apparatus comprising:
   a support frame;
   a conveyor operatively supported by the support frame for transporting discrete objects along a conveyor path in a machine direction, the conveyor being operatively connected with a first drive;
   a supplying device supported in position along the conveyor path for supplying a dough product to the conveyor, the supplying device being operatively connected with a second drive; and
   a subframe movably supported from the support frame and positioned along the conveyor path, the subframe being movable as driven by a third drive and including a conveyor engaging portion for selectively deflecting a portion of the conveyor relative to the supplying device by a first movement of the third drive and for moving the conveyor portion back to a predetermined transport position;
   wherein the subframe further comprises an object holding means for creating a positive holding force for holding an object against the conveyor, the subframe further being positioned along the conveyor path so that the object holding means is operative to hold an object while at least a portion of the object is positioned for receiving dough product from the supplying device.

2. The apparatus of claim 1, further comprising a control means that is operatively associated with the first drive and the third drive so as to move the subframe by the third drive to deflect a portion of the conveyor based upon a desired position of a discrete object with respect to the supplying device as determined by the first drive.

3. The apparatus of claim 2, wherein the first drive comprises an index drive device that indexes the conveyor in the machine direction by predetermined amounts with rests between subsequent drive actions.

4. The apparatus of claim 2, wherein the first drive comprises a continuous drive device that controllably drives the conveyor in the machine direction at a predetermined rate.

5. The apparatus of claim 2, wherein the subframe comprises a support element rotatably supporting a first roller for engagement with the conveyor, the first roller positioned for engaging a portion of the conveyor on an opposite side thereof than an object supporting side thereof.

6. The apparatus of claim 5, wherein the conveyor is an endless conveyor with the roller positioned at least partially within a loop of the endless conveyor to engage a first conveyor portion, the subframe further comprising a second roller rotatably supported from the support element also positioned within the loop of the endless conveyor but spaced from the first roller to engage the conveyor at a second portion thereof that is substantially opposed to the first conveyor portion.

7. The apparatus of claim 6, wherein the endless conveyor is further supported by at least one guide roller that defines at least in part the conveyor path in the machine direction, and the guide roller has a diameter that is less than the spacing between the first and second rollers of the subframe.

8. The apparatus of claim 2, wherein the third drive comprises a substantially linear drive mechanism for driving the subframe in a direction for deflecting a portion of the conveyor relative to the supplying device and for driving the subframe in a substantially opposite direction relative to the supplying device for moving the conveyor portion back to a predetermined transport position.

9. The apparatus of claim 8, further comprising a pair of spaced conveyors operatively supported by the support frame for transporting discrete objects along the conveyor path in the machine direction, each of the pair of conveyors being operatively connected with the first drive.

10. The apparatus of claim 2, wherein the object holding means comprises a one of a pressure differential means, a mechanical gripping means, a magnetic means, or a friction enhancement means.

11. The apparatus of claim 10, wherein the object holding means comprises a pressure differential means comprising a vacuum chamber supported by the subframe and creating a plenum positioned adjacent to the conveyor, the plenum including at least one opening by which vacuum pressure differential can be applied to a surface of a discrete object when positioned on the conveyor with at least a portion thereof below the supplying device.

12. The apparatus of claim 11, further comprising a pair of spaced conveyors operatively supported by the support frame for transporting discrete objects along the conveyor path in the machine direction, each of the pair of conveyors being operatively connected with the first drive, and the plenum being operatively supported by the subframe between the pair of spaced conveyors.

13. The apparatus of claim 12, further comprising a plurality of lanes extending in the machine direction for depositing dough product onto discrete objects transported through the apparatus at the same time, each lane including a pair of spaced conveyors that are operatively supported by the support frame for transporting discrete objects along spaced substantially parallel conveyor paths as driven in common by the first drive, wherein the supplying device comprises multiple heads so that at least one supplying device opening is positioned over each conveyor path.

14. The apparatus of claim 2, wherein the supplying device is a continuous extruder that comprises a continuous pump drive as the second drive for providing extruded dough product.

15. The apparatus of claim 14, further comprising a cutoff mechanism for slicing the extruded dough product after a predetermined length of dough product is extruded, the cutoff mechanism including a fourth drive that is operatively associated with the control means for slicing the dough product to the predetermined length.

16. The apparatus of claim 2, wherein the supplying device is a roller former type device that comprises a continuous rotational drive as the second drive for providing formed dough product.

17. The apparatus of claim 2, wherein the second drive is operatively associated with the control means for monitoring the continuous dough product extrusion process.

18. A method of depositing dough product onto at least one discrete object as the discrete object is transported in a first direction, the method comprising the steps of:
   conveying a discrete object along a conveyor path by way of a conveyor that is operatively connected with a first drive;
   supplying dough product to the conveyor from a position along the conveyor path from a supplying device that is operatively connected with a second drive; and
   deflecting at least a conveyor portion from a predetermined transport position to a position relative to the supplying device while the discrete object is positioned at least partially for receiving dough product from the supplying device and moving the conveyor portion back to a predetermined transport position while providing a positive holding force acting to urge the discrete object toward the conveyor.

19. The method of claim 18, wherein the deflecting step includes providing a subframe that is movably supported and positioned along the conveyor path, the subframe being movable as driven by a third drive and including a conveyor engaging portion for selectively deflecting the conveyor portion relative to the supplying device by a first movement of the third drive and for moving the conveyor portion back to a predetermined transport position.

20. The method of claim 18, wherein the positive holding force is created by applying a vacuum pressure differential to a surface of a discrete object when the discrete object is positioned on the conveyor with at least a portion thereof below the supplying device.

21. The method of claim 20, wherein the at least one discrete object is conveyed along the conveyor path by a series of indexed movements with rests in between, which indexed motion is provided by the first drive.

22. The method of claim 21, wherein during a plurality of indexed movements, supplied dough product is deposited onto the at least one discrete object.

23. The method of claim 22, wherein plural discrete objects are transported along the conveyor path, and during a plurality of indexed movements, supplied dough product is deposited onto a plurality of discrete objects.

24. The method of claim 20, wherein the at least one discrete object is continuously conveyed along the conveyor path, which continuous motion is provided by the first drive.

25. The method of claim 24, wherein during the continuous motion of the at least one discrete object, supplied dough product is deposited onto the at least one discrete object.

26. The method of claim 25, wherein plural discrete objects are transported along the conveyor path, and during the continuous motion of the discrete objects, supplied dough product is deposited onto a plurality of discrete objects.

27. The method of claim 18, wherein the dough product is brought into contact with a surface of the discrete object by the motion of the supplying process while the conveyor portion is deflected from a predetermined transport position.

28. The method of claim 27, further comprising a step of cutting the dough product after a predetermined amount of dough product has been supplied and depositing a dough product slug onto a surface of the discrete object.

29. The method of claim 28, wherein the cutting step is initiated before the conveyor portion begins movement back to a predetermined transport position.

30. The method of claim 18, wherein at least one tray is conveyed along the conveyor path as the discrete object for receiving dough product.

31. The method of claim 18, wherein a plurality of trays are conveyed along the conveyor path in sequence for receiving dough product.

32. The method of claim 31, wherein the plurality of trays are conveyed along a plurality of conveyor paths arranged substantially parallel to one another so that a multi-head supplying device can deposit dough product to a plurality of trays at the same time.

33. The method of claim 32, wherein cookie dough is deposited as the dough product onto the trays so that a plurality of rows of plural cookie dough slugs are arranged onto a surface of each tray.

* * * * *